Jan. 30, 1968    G. T. HOFFMANN    3,365,980
BREAKUP MOTION MECHANISM FOR OPTICAL SURFACING MACHINE
Filed Feb. 8, 1965    2 Sheets-Sheet 2

BASE CURVE

GEORGE T. HOFFMANN
INVENTOR

BY Frank C. Parker

ATTORNEY

United States Patent Office 3,365,980
Patented Jan. 30, 1968

3,365,980
BREAKUP MOTION MECHANISM FOR OPTICAL SURFACING MACHINE
George T. Hoffmann, Rochester, N.Y., assignor to Bausch & Lomb Incorporated, Rochester, N.Y., a corporation of New York
Filed Feb. 8, 1965, Ser. No. 431,145
5 Claims. (Cl. 74—602)

ABSTRACT OF THE DISCLOSURE

A breakup motion mechanism designed to vary the amplitude of the relative reciprocating motion between a crankpin and a reciprocating link. The breakup motion is obtained by means of an eccentric bushing having a spur gear formed in the outer side, said spur gear being driven by a plurality of gears off of the end of said crankpin.

---

The present invention relates to a so-called "breakup" motion mechanism for optical surfacing machines such as lens grinders, for instance, and more particularly it relates to improvements therein.

By "breakup" motion mechanism, herein referred to, is meant a mechanism for varying the amplitude of the relative reciprocating motion between a workpiece such as a lens blank and an abrasive tool used to form an optical surface such as a lens surface, for instance. For the purpose of improving the finish on ground and polished optical surfaces, "breakup" motion mechanisms have been in use for many years in various forms which produce various degrees of excellence of the finished surface.

It is an object of the present invention to provide a novel breakup motion mechanism which produces an improved quality of optical surface, is compact and sturdy in construction and reliable and quiet in operation.

It is a further object to provide such a device in which its critical operating parts rotate at comparatively low speeds so that the life of the machine is extended and service problems, particularly lubrication, are minimized.

Further objects and advantages will be apparent in the combination, arrangement and detailed construction of the component parts as described in the following specification taken in connection with the accompanying drawings, wherein.

Figure 1:
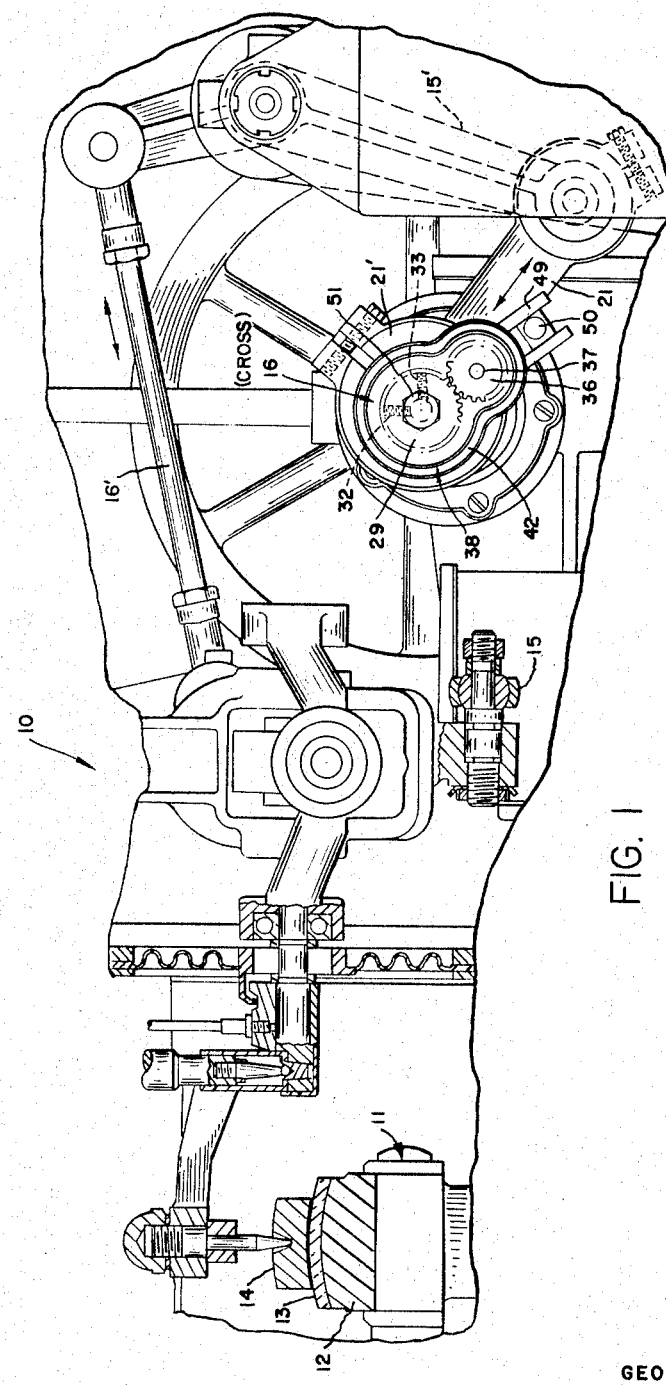
FIG. 1 is a side elevation shown partly in section and broken away of a preferred form of the invention as an operating portion of a lens grinding machine.

With reference first to FIG. 1 of the drawings, there is here shown a conventional lens grinding and/or polishing machine generally indicated by the numeral 10. Comprised in said machine 10 is a stationary workholding chuck 11 in which is held an abrasive tool 12 having a working surface across which a lens blank 13 is adapted to be moved.

Figure 6:
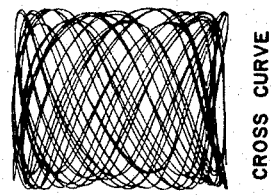
FIG. 6 is another graph showing the resultant motion of the lens blank over the tool produced when such a breakup mechanism is connected in both the cross curve mechanism and the base curve mechanism.
Figure 5:
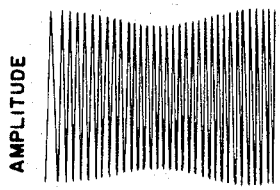
FIG. 5 is a graph showing the resultant motion produced by the breakup mechanism of this invention in the direction of the cross curve.

For grinding and/or polishing said lens blank 13, a suitable lens block 14 is adhesively held thereon in a well-known manner and said lens is reciprocated to move said lens blank 13 across the surface of the tool 12 using motions of the character indicated in FIGS. 5 and 6. The reciprocating motion of the lens 13 is provided by a driven cross curve motion mechanism 16 which is connected by actuating mechanism 15' and 16' to a base curve motion mechanism, not shown. The motion of either the base curve or cross curve mechanism 16 per se is represented by the graph in FIG. 5 and these motions together produce the composite motion pattern of FIG. 6. Preferably, the base curve and cross curve mechanisms are similar in structure, and mechanism 16 is shown more in detail in FIG. 2. The base curve mechanism (not shown) delivers its motion to the polishing machine 10 through a link 15.

Figure 2:
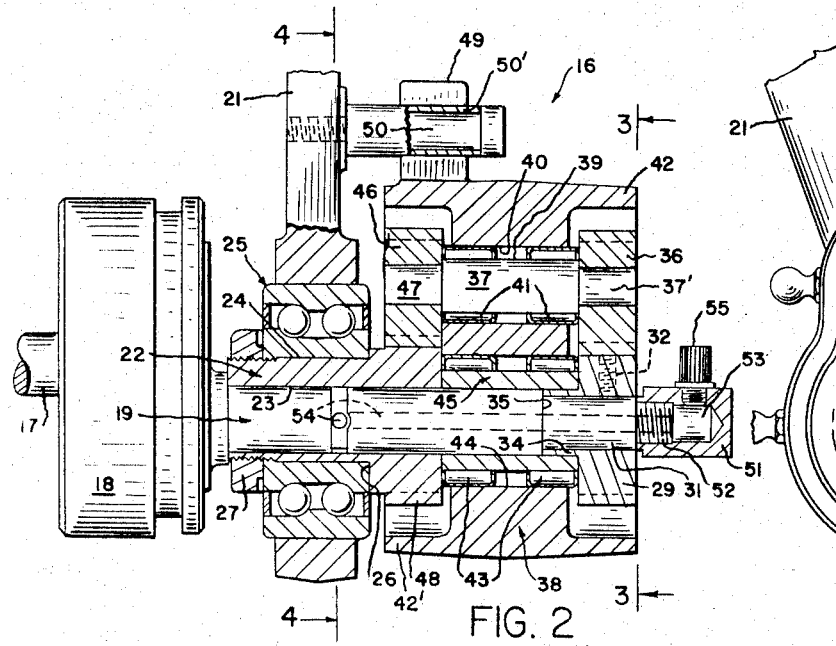
FIG. 2 is a substantially midsectional longitudinal view of the breakup motion mechanism.

As shown in FIG. 2, the main drive shaft 17 has an orbit adjusting or variable throw device 18 fixed thereon for varying the diameter of the orbit of motion of a crankpin 19, said crankpin being sturdily mounted in the device 18 with its axis parallel and eccentric to the main drive shaft 17. The crankpin 19 functions to reciprocate a link 21 which is connected thereto, and as shown in FIG. 1, the link is connected to the mechanism 16.

A so-called "breakup" motion is incorporated in the drive mechanism between the crankpin 19 and the link 21 in the form of an eccentric bushing 22 which is rotatable on the crankpin whereby the amplitude of the reciprocating motion of the actuating link 21 and the lens 13 which is driven by said link may be varied as shown in FIG. 5. In the manufacture of toric opthalmic surfaces in which a base curve and a cross curve are simultaneously produced, two "breakup" mechanisms are used and the integrated motion with which the lens 13 is moved is shown in FIG. 6. As mentioned above, the eccentric bushing 22 must be rotated slowly on the crankpin 19 to effect the variation in amplitude of said reciprocating motion of the link 21, and according to the present invention a combination of mechanism is provided for rotating the bushing 22 utilizing differential gearing.

Figure 4:
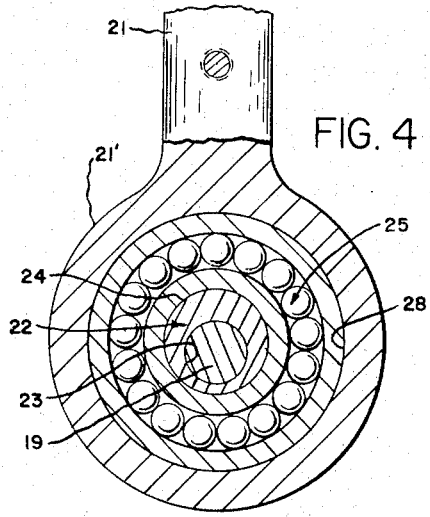
FIG. 4 is a cross-sectional view taken substantially on the line 4—4 of FIG. 2.

With respect to the detailed structure of the "breakup" motion, the eccentric bushing 22 is rotatably journaled on the crankpin 19 as best shown in FIG. 4. For this purpose, said bushing 22 is provided with a bore 23 which is rotatably fitted onto the crankpin 19, and eccentric to the bore 23 a cylindrical outer surface 24 is formed. On the surface 24 is secured a suitable antifriction bearing 25, the inner race thereof being located longitudinally by a shoulder 26 formed on the bushing 22. For holding the ball bearing 25 against the shoulder 26, a nut 27 is threaded on the adjacent end of the eccentric bushing 22 so as to bear against said bearing. In the enlarged end 21' of the link 21, as shown in FIG. 4, is formed a bore 28 wherein the outer surface of the antifriction bearing 25 is forcibly pressed or otherwise held so that slow rotation of the eccentric bushing 22 on the crankpin 19 causes a variation in the amplitude of the reciprocating motion of the link 21 in the general direction of the link as aforesaid.

Figure 3:
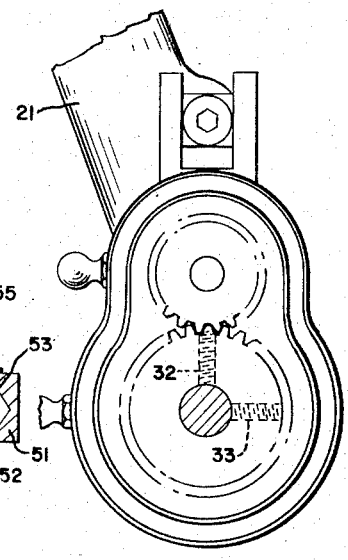
FIG. 3 is a sectional view taken on the line 3—3 of FIG. 2.

Rotation of the eccentric bushing 22 on the crankpin 19 is accomplished by providing differential gearing as an operative connection between the crankpin and the eccentric bushing 22 such that every orbital revolution of the crankpin 19 causes the eccentric bushing 22 to rotate by a predetermined amount which is either more or less than one turn. Comprised in said differential gearing is a drive gear 29 which is suitably fixed onto the free end of the crankpin 19. The drive gear 29 is actually fitted onto a reduced diameter portion 31 of the crankpin 19 and is secured thereto by a pair of angularly arranged set screws 32 and 33 which are threaded radially through said gear so as to bear against the reduced diameter mounting surface 31 as shown in FIG. 3.

Since it is advantageous for alignment reasons to provide a long contact area of the drive gear 29 on the mounting surface 31, a thin hub 34 is formed on one side of the gear which abuts against a shoulder 35 located at the inner end of the mounting surface 31.

Meshed with the drive gear 29 is an idler gear 36 which is fixed in any desired manner such as press fit on the reduced outer end 37' of a lay shaft 37. The lay shaft 37 is provided with a smooth bearing surface 39 which is rotatably mounted in a carrier member 38, the carrier member having a corresponding smooth bearing surface 40 formed therein. Between bearing surfaces 39 and 40 a plurality of roller bearings 41 are fitted whereby the lay shaft 37 is rotatably journaled in a frictionless manner in the member 38. The carrier member 38 serves in some measure as a housing since it partially encloses the gearing by rim-like longitudinally projecting flanges 42 and 42', and the carrier member per se is rotatably mounted on the crankpin 19 by a plurality of roller bearings 43 operating on and between a smooth bearing surface 44 formed in the member and a smooth hard bearing spacer 45 which also serves as an inner race for the rollers 43, said spacer being fitted onto the crankpin 19 between the bushing 22 and the drive gear 29.

All of the bearings 41 and 43 are of the so-called "needle bearing" type to afford a compact construction for low speed operation.

Several advantages are obtained from the use of a separate bearing spacer 45, one advantage being that the hardness of the metal therein may be independently chosen to withstand the forces generated by the orbital and/or reciprocating motion of the crankpin 19 and the parts mounted thereon. The other advantage lies in the extension of the bearing surface of the spacer 45 over the gear hub 34 so that a desirable reduction in the overall length of the carrier member 38 may be effected while maintaining maximum length of the bearing which also helps to reduce the bending forces on the crankpin during rotation. As aforesaid, the bearing area of the drive gear 29 is increased to secure better alignment of the gear and furthermore, the hub 34 may be cemented within the spacer 45 to effect a still further elongation of said bearing area and stabilization of gear 29.

At the inboard end of int lay shaft 37 is fixed a second idler gear 46 which is a duplicate of idler gear 36 and is held on a reduced part 47 of the lay shaft in close proximity to the carrier member 38 in the same manner as the first idler gear 36 so that end motion thereof is prevented. On the outboard end of the eccentric bushing 22 a spur gear 48 is formed in alignment with idler gear 46 for engagement therewith.

Differential rotation between the eccentric bushing 22 and the drive gear 29 is produced by forming preferably 30 teeth on spur gear 48 and only 29 teeth on drive gear 29 although both gears have the same diametral pitch and outside diameter. If the number of teeth in the driven gear 48 is represented by $n$, the number of teeth in the drive gear 29 is $n-1$, and if $x$ represents the number of teeth in each idler gear, the gear ratio of the drive gear is $x/29$ whereas the gear ratio of the driven gear is $x/30$. For preventing rotation about the crankpin 19, the housing or carrier member 38 is provided with a pair of lugs forming an open parallel-sided fork 49 therebetween and in the fork a stud 50 is held, said stud being suitably fixed at one end in the side face of the link 21 so as to extend into said fork. Preferably, a contact block 50' formed of phenolic plastic material is rotatably held on the stud 50 and the side faces thereof are slidably fitted between the furcations of the work 49.

With regard to the operation of the "breakup" motion mechanism, the carrier member 38 is prevented from rotation by the stud 50 so that when the crankpin 19 makes one orbital revolution, the drive gear 29 rotates one turn causing the idler gears 36 and 46 to rotate the spur gear 48 and the bushing 22 through the circumferential distance equal to 29 teeth, or one full rotation minus one tooth. This accounts for the differential rotation as heretofore mentioned, wherein a single rotation of drive gear 29 results in $29/30$ of a rotation of gear 48.

It is to be understood that the gearing generally may involve different choices in the number of teeth than the preferred 29 tooth, 30 tooth combination and the values chosen govern the integrated pattern of motion of the lens 13 as shown in its preferred form in FIG. 6.

Lubrication for the bearing surface of the eccentric bushing 22 is provided by a lubrication head 51 which is threaded at 52 onto an extension of the crankpin 19. Internal communicating passages for a lubricant are provided at 53 in said head 51 and in the crankpin 19 at 54 and these passages are fed through a lubricating fitting 55.

The lubricating head 51 serves a secondary function as a stop nut for the drive gear 29 in case the gear becomes loose on the crankpin.

It will be seen that the differential gearing mechanism affords an advantageous low speed of operation which extends the life of the mechanism and permits a relatively simple lubrication scheme to be used. The entire mechanism is furthermore relatively compact, simple, reliable, light, strong, and well lubricated, and although only a preferred form thereof has been shown and described in detail, changes, substitutions and modifications may be made therein without departing from the spirit of the invention as defined in the claims here appended.

I claim:

1. In a breakup motion mechanism designed to progressively vary the amplitude of a reciprocating link, said link being reciprocated by means of an orbitally rotated crankpin, the combination of
   (a) a bushing rotatably held on said crankpin and having an accentric outer surface whereon a reciprocating link is journalled,
   (b) differential gearing means comprising, a drive gear fixedly attached to said crankpin, an idler gear driven by said drive gear, a lay shaft fixedly attached to said idler gear, a second idler gear fixedly attached to said lay shaft and a spur gear driven by said second idler gear and formed on an outer surface of said bushing, the total number of teeth on said spur gear being different than the number of teeth on said drive gear,
   (c) a carrier member journalled on said crankpin and serving as means for mounting said idler gears rotatably thereon, and
   (d) means operatively constructed for preventing continuous rotation of said carrier member on said crankpin.

2. In a breakup motion mechanism designed to progressively vary the amplitude of a reciprocating link, said link being reciprocated by means of an orbitally rotated crankpin, said means comprising
   (e) an eccentric bushing rotatably mounted on said crankpin and having an eccentric outer surface whereupon the reciprocating link is journalled,
   (b) a drive gear fixed on said crankpin and axially spaced from said bushing,
   (c) an idler gear engaged with said drive gear,
   (d) a lay shaft to which said idler gear is fixed at one end, said shaft extending parallel to said crankpin,
   (e) a carrier member in which said lay shaft is journalled, said member being rotatably mounted on said crankpin in the space between the bushing and the drive gear,
   (f) a second idler gear fixed to the other end of the lay shaft and located on the inward side of said carrier member,
   (g) a driven gear formed on said bushing and engaged with said second idler gear for rotating said eccentric bushing, the gear ratio between the driven gear and the second idler gear being different than the gear ratio between the drive gear and the idler gear, and (h) means operatively constructed for preventing continuous rotation of said carrier member on said crankpin.

3. In a breakup motion mechanism designed to progressively vary the amplitude of a reciprocating link said link being reciprocated by means of an orbitally rotated crankpin, the combination of (a) a bushing having a cylindrical surface forming a bore which is rotatably mounted on said crankpin, (b) an exterior bearing surface formed on and adjacent to one end of the bushing eccentrically of its bore, (c) a driven gear formed concentrically on said bore on the other end of said bushing and having $n$ number of teeth, (d) a tubular spacer of uniform wall thickness mounted on said crankpin and having an outer hardened bearing surface formed thereon, (e) a drive gear being held in abutment with one end of said spacer and having $n-1$ number of teeth, (f) means for securing said drive gear non-rotatably onto said crankpin, (g) a pair of mutually spaced idler gears engaged respectively with said drive and driven gears, (h) a lay shaft extending between and fixed to each of said idler gears, (i) a carrier member journalled on said hardened bearing surface and extending freely between said idler gears and having said lay shaft journalled therein, and (j) means operatively constructed for preventing continuous rotation of said carrier member on said crankpin, whereby the difference between the number of teeth in the drive and driven gears results in a differential rotation therebetween with a consequent variation in the length of stroke of the link.

4. In a breakup motion mechanism designed to progressively vary the amplitude of a reciprocating link, said link being reciprocated by means of an orbitally rotated crankpin, the combination of (a) a rotatably driven bushing having a cylindrical surface forming a bore which is rotatably journalled on said crankpin, (b) an exterior bearing surface formed on and adjacent to one end of the driven bushing eccentrically of its bore, (c) a driven gear formed concentrically of said bore on the outboard end of said driven bushing and having $n$ number of teeth, (d) a tubular spacer of uniform wall thickness mounted on said crankpin contiguously to said driven bushing, (e) an outer hardened bearing surface formed on said spacer, (f) a drive gear held in abutment with one end of said spacer, said drive gear having $n-1$ number of teeth, (g) a reduced diameter mounting surface formed on said crankpin partly beyond said spacer and extending longitudinally therebeyond, (h) a hub formed on said drive gear and extending along said reduced diameter surface beneath said spacer whereby the hub is covered by the spacer, (i) means for fixedly attaching the drive gear on said reduced diameter mounting surface, (j) a pair of mutually spaced idler gears respectively engaged with said drive and driven gears, (k) a lay shaft extending between and fixed to said idler gears, (l) a carrier member journalled on said hardened bearing surface and lying between said idler gears and having said lay shaft journalled therein, and (m) means formed on said link on said carrier member for preventing the rotation of the carrier member with respect to the link, whereby the difference between the number of teeth in the drive and driven gears results in a differential rotation therebetween and a variation in the amplitude of the reciprocating motion of said link.

5. The combination as defined by claim 1 and further characterized by (a) remote lubrication means comprising a threaded extension formed on the outer end of said crankpin, a lubrication adapter threaded on said extension and carrying a lubricative fitting thereon, the diameter of said lubrication adapter being larger than the adjacent part of the crankpin thereby acting as a safety stop nut to prevent outward movement of said drive gear, means forming passageways internally of said crankpin, said passageways originating at the lubricative fitting and terminating at the exterior surface of the crankpin whereby said remote lubrication means may be applied through the lubricative fitting carried on the lubrication adapter, through the internal passageways formed in said crankpin to the exterior surface of said crankpin thereby providing means of lubricating the exterior surface of said crankpin.

References Cited

UNITED STATES PATENTS

| | | | |
|---|---|---|---|
| 2,159,620 | 5/1939 | Long | 51—160 |
| 2,176,154 | 10/1939 | Shannon | 51—160 X |
| 2,192,486 | 3/1940 | Lockhart | 51—160 |
| 3,213,569 | 10/1965 | Hauger | 51—160 |

ROBERT C. RIORDON, *Primary Examiner.*

D. G. KELLY, *Assistant Examiner.*